(12) United States Patent
Pantelias et al.

(10) Patent No.: US 7,898,967 B2
(45) Date of Patent: Mar. 1, 2011

(54) MULTIPLE UPSTREAM CHANNEL DESCRIPTOR MESSAGES POINTING TO SINGLE UPSTREAM CHANNEL ID FOR MORE EFFICIENT OPERATION OF A DOCSIS SYSTEM

(75) Inventors: Niki Roberta Pantelias, Duluth, GA (US); Victor T. Hou, La Jolla, CA (US)

(73) Assignee: Broadcom Corporation, Irvine, CA (US)

( * ) Notice: Subject to any disclaimer, the term of this patent is extended or adjusted under 35 U.S.C. 154(b) by 911 days.

(21) Appl. No.: 11/503,281

(22) Filed: Aug. 14, 2006

(65) Prior Publication Data

US 2007/0223513 A1 Sep. 27, 2007

Related U.S. Application Data

(60) Provisional application No. 60/784,467, filed on Mar. 22, 2006.

(51) Int. Cl.
*H04L 12/26* (2006.01)

(52) U.S. Cl. ......... 370/248; 370/389; 370/437; 370/468; 370/538; 725/111

(58) Field of Classification Search ............... 370/464, 370/248, 389, 437, 468, 538; 725/111
See application file for complete search history.

(56) References Cited

U.S. PATENT DOCUMENTS

| | | | | |
|---|---|---|---|---|
| 6,459,703 | B1 * | 10/2002 | Grimwood et al. | 370/442 |
| 2004/0008683 | A1 * | 1/2004 | Cloonan et al. | 370/395.4 |
| 2004/0233926 | A1 * | 11/2004 | Cummings | 370/437 |
| 2005/0025145 | A1 * | 2/2005 | Rakib et al. | 370/389 |
| 2005/0078699 | A1 | 4/2005 | Cummings | |

OTHER PUBLICATIONS

European Search Report, for European Patent Application No. 06023165.1, 6 pages, dated May 3, 2007.
*Data-Over-Cable Service Interface Specifications DOCSIS 2.0: Radio Frequency Interface Specification*, pp. 1-40, and 137-140, Cable Television Laboratories, Inc., Copyright 1999-2005.
*Data-Over-Cable Service Interface Specifications DOCSIS 3.0: MAC and Upper Layer Protocols Interface Specification*, pp. 1-100, Cable Television Laboratories, Inc., Copyright 2006.

* cited by examiner

*Primary Examiner* — Ricky Ngo
*Assistant Examiner* — Luat Phung
(74) *Attorney, Agent, or Firm* — Sterne, Kessler, Goldstein & Fox P.L.L.C.

(57) ABSTRACT

In a DOCSIS-based communications system, different upstream channel descriptors (UCDs) all identify a single logical upsteam channel identifier (UCID) regardless of the type of cable modem (CM) to which the UCDs are sent. Different CMs having different capabilities (e.g., CMs configured according to the different DOCSIS standards 1.x, 2.0, and 3.0) receive their respective UCDs from an upstream headend. All the UCDs, however, refer to the same logical upstream channel. The different CMs therefore share this single logical upstream channel.

20 Claims, 4 Drawing Sheets

MULTIPLE UPSTREAM CHANNEL DESCRIPTOR MESSAGES POINTING TO SINGLE UPSTREAM CHANNEL ID FOR MORE EFFICIENT OPERATION OF A DOCSIS SYSTEM

This patent application claims priority to U.S. Provisional Patent Application 60/784,467, filed Mar. 22, 2006, which is incorporated herein by reference in its entirety.

BACKGROUND OF THE INVENTION

1. Field of the Invention

The invention described herein relates to communications systems, and more particularly to management of logical channels.

2. Background Art

In systems that follow the Data Over Cable Service Interface Specification (DOCSIS), there is an Upstream Channel Descriptor (UCD) message that is received by cable modems (CMs) in the downstream, i.e., in communications from a headend to a CM. The UCD describes the physical channel parameters of an upstream channel, i.e., a channel used to convey messages from a CM to the headend. The UCD identifies an upstream channel by an Upstream Channel Identifier (UCID) that is unique within a media access control (MAC) domain. A MAC domain is a collection of downstream and upstream channels that is managed under one MAC management entity and that is synchronized under the same timebase. In DOCSIS 1.0, 1.1, and 2.0, after a CM's operation on a particular upstream is determined, the CM only needs to examine UCD messages that contain the UCID of that channel for any changes to the parameters. The CM need not examine messages that have UCIDs for other channels. A change of parameters in the UCD is indicated by an incrementing of the Configuration Change Count in the UCD.

The UCID of the upstream channel also plays a role in the downstream MAP message. A MAP message defines the time and duration of various upstream transmission opportunities on an upstream channel. A MAP message contains a field that has the UCID corresponding to the upstream channel that it is describing. Thus, a CM only needs to look at a MAP message that contains the UCID of the upstream channel that it is using, and need not examine messages that have UCIDs for other channels.

In DOCSIS 2.0, the concept of logical upstream channels was introduced. Multiple logical channels can operate within the same upstream spectrum and are allocated different regions of time in Time Division Multiplex fashion. In particular, DOCSIS 2.0 defined two logical channels to be supported within one physical channel: one logical channel for TDMA transmission and another logical channel for synchronous-code division multiple access (S-CDMA) transmission. Each logical channel is described by its own UCD, and each UCD for a logical channel contains a unique UCID. A CM that operates on one logical channel ignores UCDs for other logical channels that operate in the same spectrum. The CM has no need to understand the existence of other logical channels. The cable modem termination system (CMTS) scheduler keeps track of upstream transmit opportunities that are provided for each of the logical channels as described by the individual MAP messages for each logical channel.

In DOCSIS 3.0, a new type of UCD has been introduced for backwards compatibility reasons. Pre-3.0 DOCSIS cable modems (CMs) will not use this new type of UCD. However, it would be advantageous to be able to support multiple types of CMs, e.g., CMs operating under different communications standards, like DOCSIS 3.0, DOCSIS 2.0, or a version of DOCSIS 1.0 (referred to herein as DOCSIS 1.x) on the same upstream frequency channel without using multiple logical channels. Logical channels can be used for various purposes and therefore allocating them just to separate out 3.0 from 2.0 from 1.x upstream CM communications is not the best use of these logical channels. There is a need, therefore, for a system in which CMs of different types can send upstream communications without having to allocate an upstream logical channel for each CM type.

BRIEF SUMMARY OF THE INVENTION

Different UCDs all identify a single logical upstream channel regardless of the type of CM to which the UCDs are sent. Different CMs having different capabilities (e.g., CMs configured according to the different DOCSIS standards 1.x, 2.0, and 3.0) receive UCDs from a CMTS and preferentially select a UCD with the highest version that is consistent with the DOCSIS version supported by the CM. All the UCDs, however, refer to the same upstream logical channel. The different CMs therefore share this single upstream logical channel.

Compared to the approach described herein, using multiple logical channels to separate DOCSIS 3.0, DOCSIS 2.0, and DOCSIS 1.x CMs that co-exist in the same upstream physical channel consumes more resources, creates more constraints on the scheduler, and results in lost statistical multiplexing gain due to separation of a large bandwidth pipe into several separate smaller pipes. These problems can be circumvented by allowing devices, such as CMs, with different capabilities (as expressed by the different UCDs) to use the same logical channel.

Note that the invention is described herein with respect to cable modems. It should be understood, however, that the invention can operate in conjunction with other types of end-user devices in a system operating under DOCSIS or a similar standard.

BRIEF DESCRIPTION OF THE DRAWINGS/FIGURES

Figure 1:
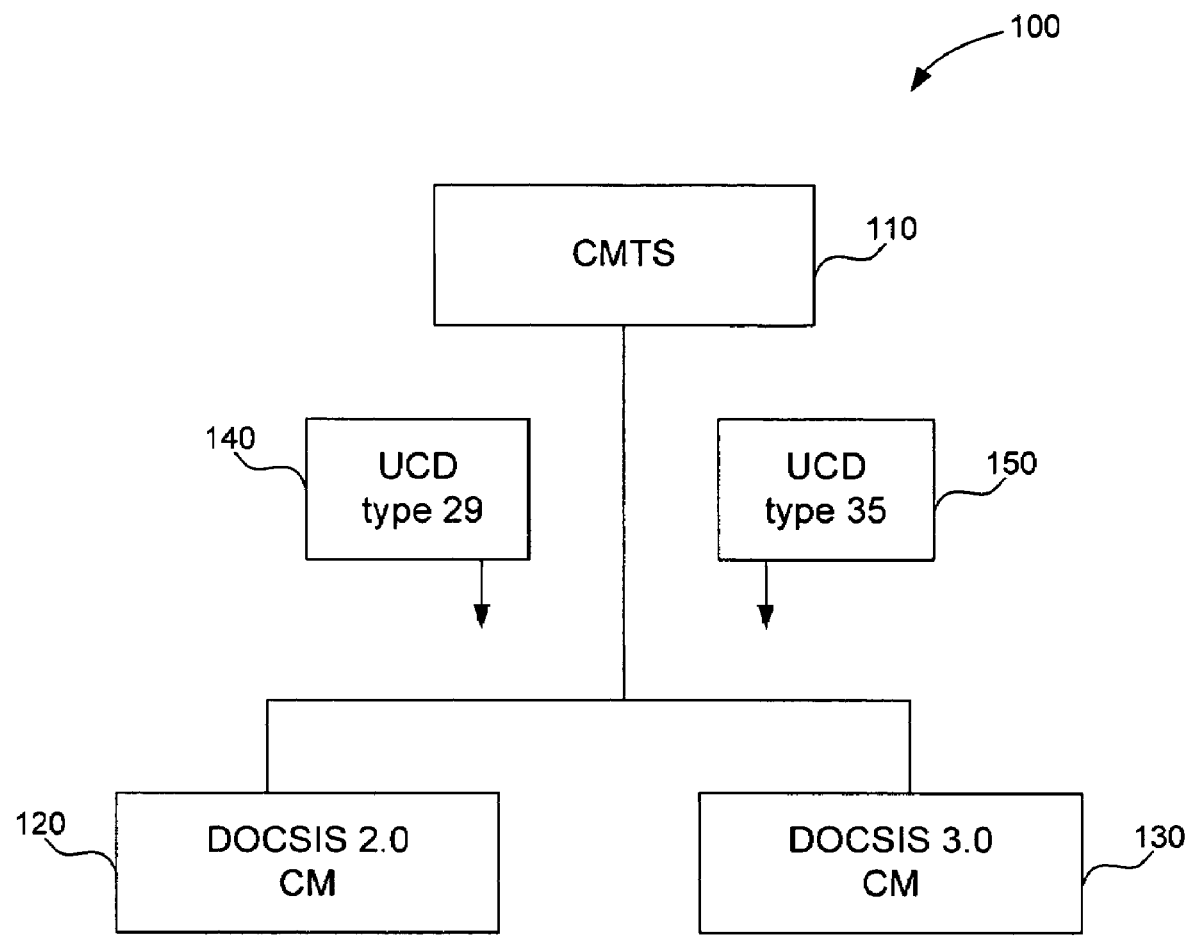
FIG. 1 illustrates the transmission of two different UCD types to CMs operating under two different DOCSIS standards, according to an embodiment of the invention.

Further embodiments, features, and advantages of the present invention, as well as the operation of the various embodiments of the present invention, are described below with reference to the accompanying drawings.

DETAILED DESCRIPTION OF THE INVENTION

One embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

In DOCSIS 3.0, a number of new features and capabilities are specified for the CM and CMTS. The changes that are introduced involve the physical layer, the MAC sublayer, the network layer, security, and network management.

DOCSIS 3.0 also introduces a new type of UCD. In DOCSIS 1.x, a UCD carried a type value of 2 in the MAC Management Message header. In DOCSIS 2.0, another type of UCD was introduced to describe a channel to be used with DOCSIS 2.0 advanced physical layer parameters. The "DOCSIS 2.0 only" UCD carried a type value of 29. In DOCSIS 2.0, a channel with both 1.x and 2.0 physical layer parameters is also described by a UCD of type 2. For DOCSIS 3.0, a new UCD of type 35 is defined. If a CMTS sends a UCD of type 35, any DOCSIS 1.x or 2.0 CM will ignore this UCD since they will not understand the type 35 value. However, 3.0 CMs will be able to interpret the type 35 value.

A type 35 UCD is used in DOCSIS 3.0 to describe an upstream channel in which any of the following DOCSIS 3.0 features are utilized:

1) Burst attributes that enable Selectable Active Codes (SAC) Mode 2 and Code Hopping Mode 2.

2) Burst descriptors corresponding to any of the following Interval Usage Codes (IUCs) 1, 2, 3, 4, 5, 6, 9, 10, and 11.

3) Burst attributes associated with IUC 11 that are not intended for Unsolicited Grant Service (UGS).

DOCSIS 3.0 introduces a physical layer feature that improves ingress noise mitigation when using synchronous-code division multiple access (S-CDMA) in the upstream. With SAC Mode 2, the active codes to be used can be selected from the set of 128 spreading codes. With Code Hopping Mode 2, code hopping is performed only over the active codes that have been selected. DOCSIS 3.0 also introduces the ability of the CMTS to assign burst profiles dynamically to CMs when providing a data grant. Therefore, the type 35 UCD can provide burst profiles corresponding to all the IUCs mentioned above. In addition, DOCSIS 3.0 removes the restriction in DOCSIS 2.0 that IUC 11 has to be associated with UGS grants.

An embodiment of the invention allows a logical channel to be shared among CMs operating under different communications standards, e.g., DOCSIS 3.0 and DOCSIS 2.0 CMs, DOCSIS 3.0 and 1.x CMs, or all three. It is assumed here that logical channels are not used to separate the different CMs with respect to their DOCSIS version support.

First, the case of DOCSIS 2.0 and 3.0 CMs on the same logical upstream channel is discussed. Because certain legacy DOCSIS 2.0 CMs actually check for existence of IUC 5 and 6 in a type 29 UCD and therefore reject such a UCD, a type 29 UCD cannot be used if the intent is to provide one UCD that can be used by 3.0 CMs (which can be assigned any of IUCs 5, 6, 9, 10, and 11 for data), and by 2.0 CMs (that will only use 9, 10, and 11 for data).

Therefore, the embodiment to be discussed involves using two different UCDs that use the same UCID value representing a single logical upstream channel. One UCD is a type 35 UCD that will be ignored by DOCSIS 2.0 CMs, and the other is a type 29 UCD that can be used by DOCSIS 2.0 CMs. The DOCSIS 3.0 CMs will preferentially choose the type 35 UCD over the type 29 UCD per the DOCSIS specifications. Given that the both UCDs point to the same UCID, only one MAP is needed to describe the upstream transmission opportunities on the channel.

Figure 2:
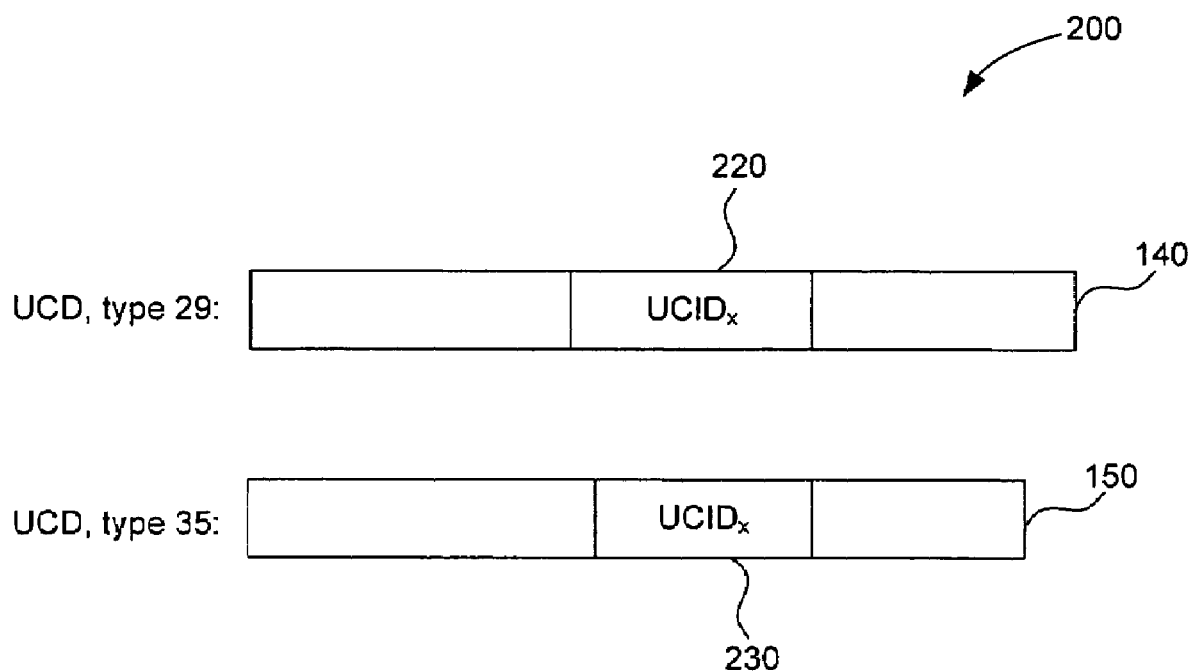
FIG. 2 illustrates in greater detail the UCDs of FIG. 1 and the UCID fields therein, according to an embodiment of the invention.

This embodiment of the invention is illustrated in FIGS. 1 and 2. In FIG. 1, a CMTS 110 sends two UCDs downstream. UCD 140 is of type 29; UCD 150 is of type 35. These UCDs are received by two CMs operating under two respective communications standards, a DOCSIS 2.0 CM 120, and a DOCSIS 3.0 CM 130. Type 35 UCD 150 will be ignored by CM 120, which will instead accept type 29 UCD 140. CM 130 will choose to accept type 35 UCD 150. FIG. 2 shows both types of UCDs. Type 29 UCD 140 has a UCID field 220, while type 35 UCD 150 has a UCID field 230. Both fields, however, contain references to the same single logical upstream channel $UCID_x$.

Now, the case of DOCSIS 1.x, 2.0, and 3.0 CMs on the same logical upstream channel is discussed. The same issue, as discussed before regarding certain legacy DOCSIS 2.0 CMs checking for existence of IUC 5 and 6 in a Type 29 UCD, still applies. Therefore, multiple UCDs all pointing to the same UCID can be used as a solution in an embodiment of the invention. In this case, there may be two or three UCDs pointing to the same UCID. But with 1.x CMs, there is an additional consideration. To work with current upstream burst receivers, the preamble used for a particular burst profile corresponding to an IUC has to be the same for any CM using the burst profile on the channel. Since DOCSIS 1.x preambles are different than preambles for DOCSIS 2.0 and afterwards, then for a case in which DOCSIS 1.x and DOCSIS 2.0 and 3.0 are sharing the same single logical upstream channel, the preamble type for IUCs 1, 2, 3, 4, 5, and 6 have to be identical.

Figure 3:
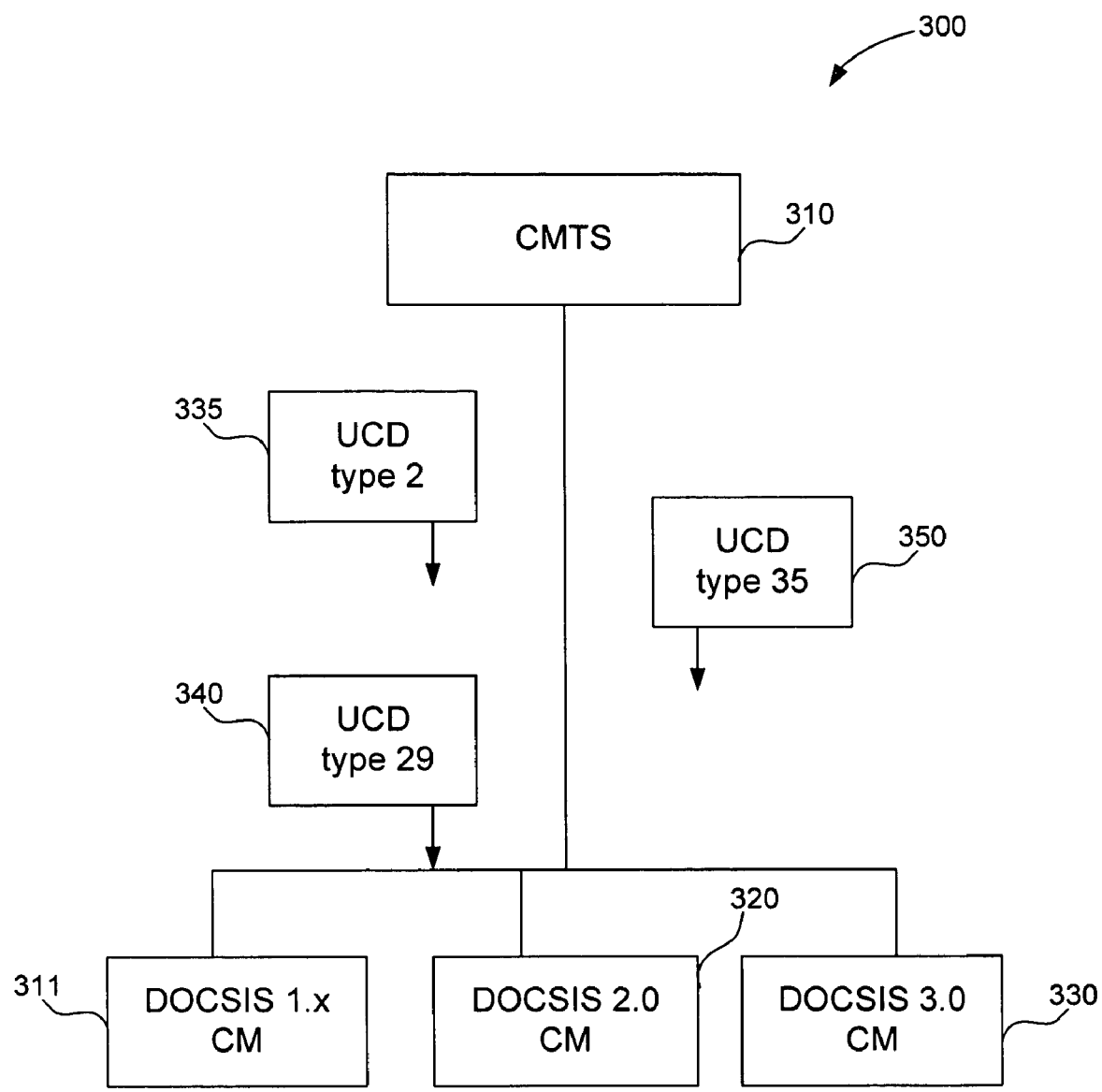
FIG. 3 illustrates the transmission of three different UCD types to CMs operating under three different DOCSIS standards, according to an embodiment of the invention.
Figure 4:
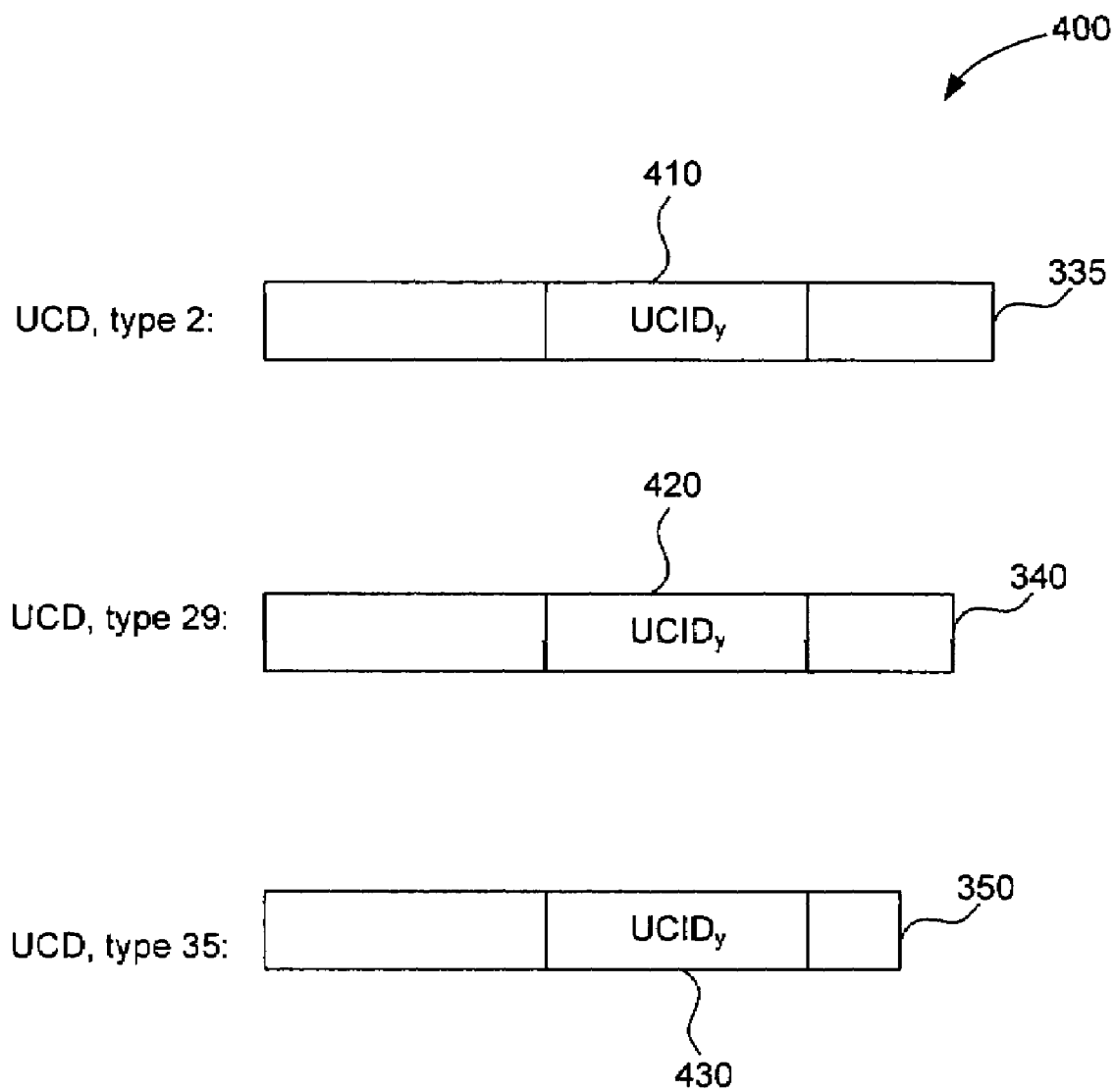
FIG. 4 illustrates in greater detail the UCDs of FIG. 3 and the UCID fields therein, according to an embodiment of the invention.

Therefore, for a channel that is described using multiple UCDs with different types, the UCDs have the following constraints:

One of the UCDs is of type 35 and the other one can be of type 2 or type 29, or there are three UCDs, where one is of type 35, one is of type 2 and one is of type 29. The latter case is shown in FIGS. 3 and 4. A CMTS 310 sends UCDs 335, 340, and 350, having types 2, 29, and 35 respectively. CM 311 accepts UCD 335 (type 2); CM 320 accepts UCD 340 (type 29); and CM 330 accepts UCD 350 (type 35). FIG. 4 shows these three UCDs with their respective UCID fields 410, 420, and 430. All the UCID fields indicate the same single logical upstream channel, $UCID_y$.

Burst attributes corresponding to the same IUC are identical in each of the UCDs in the set.

If there is a UCD of type 2 in the set describing the channel, the burst descriptors for IUC 1, 2, 3, 4, 5, and 6 are type 4 burst descriptors (with DOCSIS 1.x preambles) and the burst descriptors for IUC 9, 10, and 11 are of type 5 (with DOCSIS 2.0 preambles).

If there is a UCD of type 29 and a UCD of type 35 in the set with no UCD of type 2, the burst descriptors for IUC 1, 2, 3, 5, 6, 9, 10, and 11 are of type 5.

This invention would not be restricted to necessarily just two or three UCDs mapped to one UCID. A future version of DOCSIS could introduce another UCD type, and then there could be more than three UCDs mapped to one UCID.

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

What is claimed is:

1. A system for allocating a single logical upstream channel to cable modems of different communications standards, comprising:
   a cable modem termination system configured to send a plurality of upstream channel descriptors (UCDs), each of said plurality of UCDs having a different numerical type value from among a plurality of numerical type values, wherein each of said plurality of UCDs identifies the single logical upstream channel; and
   a plurality of cable modems, each of said plurality of cable modems being configured to operate in accordance with a corresponding communication standard from among a plurality of communications standards, such that said plurality of cable modems are configured to receive said plurality of UCDs and to transmit upstream data over the single logical upstream channel.

2. The system of claim 1, wherein said system operates under a version of the Data Over Cable Interface Standard (DOCSIS).

3. The system of claim 2, wherein said plurality of numerical type values include a DOCSIS UCD numerical type value 2.

4. The system of claim 2, wherein said plurality of numerical type values include a DOCSIS UCD numerical type value 29.

5. The system of claim 2, wherein said plurality of numerical type values include a DOCSIS UCD numerical type value 35.

6. The system of claim 2, wherein said plurality of communications standards comprise a version of DOCSIS 1.

7. The system of claim 2, wherein said plurality of communications standards comprise DOCSIS 2.0.

8. The system of claim 2, wherein said plurality of communications standards comprise DOCSIS 3.0.

9. The system of claim 2, wherein said plurality of UCDs comprise:
   a DOCSIS UCD of type 29; and
   a DOCSIS UCD of type 35.

10. The system of claim 2, wherein said plurality of UCDs comprise:
    a DOCSIS UCD of type 2; and
    a DOCSIS UCD of tune 35.

11. A system for allocating a single logical upstream channel to cable modems of different communications standards, comprising:
    a cable modem termination system configured to send a plurality of upstream channel descriptors (UCDs) of a plurality of types, each of said plurality of types including an upstream channel identifier (UCID) that identifies the single logical upstream channel, wherein said UCDs of said plurality of types comprise:
    a Data Over Cable Interface Standard (DOCSIS) UCD of type 2,
    a DOCSIS UCD of type 29, and
    a DOCSIS UCD of type 35; and
    a plurality of cable modems, each of said plurality of cable modems being configured to operate in accordance with a corresponding communication standard from among a plurality of communications standards, such that said plurality of cable modems are configured to receive said plurality of UCDs and to transmit upstream data over the single logical upstream channel.

12. A system for allocating a single logical upstream channel, identified by an upstream channel identifier (UCID), to end user devices of different communications standards, the system comprising:
    a central controller configured to send a plurality of upstream channel descriptors (UCDs), each of said plurality of UCDs having a different numerical type value from among a plurality of numerical type values, wherein each of said plurality of UCDs identifies the single logical upstream channel; and
    a plurality of end user devices, each of said plurality of end user devices being configured to operate in accordance with a corresponding communication standard from among a plurality of communications standards, such that said plurality of end user devices are configured to receive said plurality of UCDs and to transmit upstream data over the single logical upstream channel.

13. The system of claim 1, wherein said plurality of numerical type values are numerical Data Over Cable Interface Standard (DOCSIS) type values.

14. The system of claim 1, wherein said plurality of numerical type values comprise:
    a first numerical type value corresponding to a version of Data Over Cable Interface Standard (DOCSIS) 1;
    a second numerical type value corresponding to a version of DOCSIS 2; and
    a third numerical type value corresponding to a version of DOCSIS 3,
    wherein said first numerical type value, said second numerical type value, and said third numerical type value are different from each other.

15. The system of claim 14, wherein said first numerical type value is 2, wherein said second numerical type value is 29, and wherein said third numerical type value is 35.

16. The system of claim 12, wherein said system operates under a version of the Data Over Cable Interface Standard (DOCSIS).

17. The system of claim 12, wherein said plurality of numerical type values are numerical Data Over Cable Interface Standard (DOCSIS) type values.

18. The system of claim 12, wherein said plurality of numerical type values comprise:
    a first numerical type value corresponding to a version of Data Over Cable Interface Standard (DOCSIS) 1;
    a second numerical type value corresponding to a version of DOCSIS 2; and
    a third numerical type value corresponding to a version of DOCSIS 3,
    wherein said first numerical type value, said second numerical type value, and said third numerical type value are different from each other.

19. The system of claim 18, wherein said first numerical type value is 2, wherein said second numerical type value is 29, and wherein said third numerical type value is 35.

20. A system for allocating a single logical upstream channel to cable modems of different communications standards, comprising:
    a cable modem termination system configured to send a plurality of upstream channel descriptors (UCDs), each of said plurality of UCDs having a different Data Over Cable Interface Standard (DOCSIS) message type value from among a plurality of DOCSIS message type values, wherein each of said plurality of UCDs identify the single logical upstream channel; and
    a plurality of cable modems configured to receive said plurality of UCDs and to transmit upstream data over the single logical upstream channel.

* * * * *

UNITED STATES PATENT AND TRADEMARK OFFICE
CERTIFICATE OF CORRECTION

| | | |
|---|---|---|
| PATENT NO. | : 7,898,967 B2 | Page 1 of 1 |
| APPLICATION NO. | : 11/503281 | |
| DATED | : March 1, 2011 | |
| INVENTOR(S) | : Pantelias et al. | |

It is certified that error appears in the above-identified patent and that said Letters Patent is hereby corrected as shown below:

At column 5, line 45, "tune" should be replaced with --type--.

Signed and Sealed this
Second Day of August, 2011

David J. Kappos
*Director of the United States Patent and Trademark Office*